(12) United States Patent
Nam (10) Patent No.: US 9,311,523 B1
(45) Date of Patent: Apr. 12, 2016

(54) METHOD AND APPARATUS FOR SUPPORTING OBJECT RECOGNITION

(71) Applicant: STRADVISION KOREA, INC., Gyeongbuk (KR)

(72) Inventor: Woonhyun Nam, Gyeongbuk (KR)

(73) Assignee: StradVision Korea, Inc., Gyeongbuk (KR)

( * ) Notice: Subject to any disclaimer, the term of this patent is extended or adjusted under 35 U.S.C. 154(b) by 0 days.

(21) Appl. No.: 14/811,916

(22) Filed: Jul. 29, 2015

(51) Int. Cl.
*G06K 9/00* (2006.01)
*G06T 7/20* (2006.01)
*G06T 7/00* (2006.01)

(52) U.S. Cl.
CPC .......... *G06K 9/00234* (2013.01); *G06T 7/0022* (2013.01); *G06T 7/2013* (2013.01); *G06T 2207/20216* (2013.01); *G06T 2207/30201* (2013.01)

(58) Field of Classification Search
CPC .............. G06K 9/4614; G06K 9/6234; G06K 9/00288; G06K 9/4671; G06K 9/62; G06K 9/6262; G06K 9/6267; G06K 9/78; G06K 9/6256; G06K 9/626; G06K 9/4676; G06K 9/6292; G06N 3/02; G06F 17/30247; G06T 2207/20021; G06T 7/408; G06T 2207/20081
See application file for complete search history.

(56) References Cited

U.S. PATENT DOCUMENTS

| | | | |
|---|---|---|---|
| 2012/0219224 A1* | 8/2012 | Ding et al. ........... | G06K 9/4642 382/195 |
| 2013/0121576 A1* | 5/2013 | Hsu .......................... | G06T 5/40 382/167 |
| 2015/0154441 A1* | 6/2015 | Zhang et al. ....... | G06K 9/00221 382/118 |

* cited by examiner

*Primary Examiner* — Edward Park
(74) *Attorney, Agent, or Firm* — Husch Blackwell LLP (57) ABSTRACT

A method for supporting object recognition is disclosed. The method includes the steps of: setting calculation blocks, each of which includes one or more pixels in an image, acquiring respective average values of the pixels included in the respective calculation blocks, and matching information on the respective calculation blocks with the respective average values or respective adjusted values derived from the respective average values; referring to information on windows, each of which includes information on one or more reference blocks which are different in at least either positions or sizes and information on corresponding relations between the calculation blocks and the average values or the adjusted values, to thereby assign the respective average values or the respective adjusted values to the respective reference blocks; and acquiring necessary information by using the respective average values or the respective adjusted values assigned to the respective reference blocks.

26 Claims, 9 Drawing Sheets

$$iimg(x,y) = \sum_{x'<x} \sum_{y'<y} img(x',y')$$

LOOK UP TABLE

| FEATURE | SHORT CODE | RECOGNITION PROBABILITY |
|---------|------------|-------------------------|
| #1 | 81 | 0.7 |
| #2 | 82 | 0.4 |
| #3 | 84 | 0.8 |
| ... | ... | ... |
| #n | 90 | 0.9 |

FIG. 9

METHOD AND APPARATUS FOR SUPPORTING OBJECT RECOGNITION

FIELD OF THE INVENTION

The present invention relates to a method and an apparatus for supporting object recognition; and more particularly, to the method and the apparatus for (i) setting calculation blocks, each of which includes one or more pixels in a training image, acquiring respective average values of the pixels included in the respective calculation blocks, and matching information on the respective calculation blocks with the respective average values or respective adjusted values derived from the respective average values; (ii) referring to information on windows, each of which includes information on one or more reference blocks which are different in at least either positions or sizes and information on corresponding relations between the calculation blocks and the average values or the adjusted values, to thereby assign the respective average values or the respective adjusted values to the respective reference blocks; and (iii) acquiring necessary information to be used for recognizing an object by using the respective average values or the respective adjusted values assigned to the respective reference blocks; or to the method and the apparatus for recognizing an object in a test image by using the necessary information.

BACKGROUND OF THE INVENTION

Various object recognition modules have been embedded in a variety of electronic devices. For example, a smart TV performs user authentication through face recognition.

Object recognition technologies may cause overhead in the electronic devices because they generally require processes of handling tremendous amount of data. Since the object recognition modules embedded in the individual electronic devices are required to handle the tremendous amount of data in real time in many cases, a technology for handling the data quickly in such individual electronic devices with limited computational capabilities is needed.

Meanwhile, a method using binary descriptors which store information on images of objects in binary codes was suggested. The binary descriptors express information on shape, brightness, appearance, etc. of the objects in binary codes. The method using the binary descriptors guarantee fast and stabilized performance compared to a linear classification method under situations where a lot of training sets are inputted. Binary descriptors include Local Binary Patterns (LBP), Modified Census Transform (MCT), Ferns, etc.

A face recognition method using the LBP may express a value acquired by comparing pixel intensity of a local point with pixel intensities of neighboring pixels as a binary code. Specifically, the face recognition method using the LBP may express a result acquired by comparing the intensity of the center pixel with the intensities of eight neighboring pixels as a binary code.

Similar to the LBP method, even a face recognition method using the MCT may also express a value acquired by comparing pixel intensity of a local point with pixel intensities of neighboring pixels as a binary code. However, the face recognition method using the MCT may express a result acquired by comparing the intensities of nine pixels included in a block of size 3×3 with an average intensity of the nine pixels as a binary code.

However, the LBP method or the MCT method have problems of failing in convergence or failing in pose classification when processes of learning are performed by an object recognition apparatus which includes a module of executing the LBP method or the MCT method. Specifically, there are problems of failing in convergence upon two-class learning process as the case may be (for example, if there are a large degree of variation in training samples) and failing in pose classification upon multi-class learning process.

Contrary to the LBP method and the MCT method, a Ferns method may express a result acquired by comparing an intensity of a first pixel with that of a second pixel which is apart from the first pixel as a binary code. However, since even the Ferns method compares the intensities between the pixels, the Ferns may significantly drop the overall object recognition rates if there occurs any error in a pixel value.

In particular, as an amount of inputted training sets increases, an amount of calculation rises very sharply. Therefore, a new technology for performing the object recognition faster compared to the existing methods, such as HOG, Gabor and the like, is required.

SUMMARY OF THE INVENTION

It is an object of the present invention to solve all the problems mentioned above.

It is another object of the present invention to suggest a technology with a better classification performance compared to other binary features.

It is still another object of the present invention to propose a technology with higher calculation speed compared to other features such as Gabor or HOG.

It is still yet another object of the present invention to suggest a technology to be used effectively for single-class learning and multi-class learning.

It is still yet another object of the present invention to suggest a technology capable of working effectively for samples with many variations.

It is still yet another object of the present invention to suggest a technology capable of reducing a chance of overfitting on learning samples compared to local features.

It is still yet another object of the present invention to provide a technology capable of modeling a classifier by using smaller number of weak classifiers.

It is still yet another object of the present invention to suggest a technology which uses smaller number of points compared to Ferns.

In accordance with one aspect of present invention, there is provided a method for supporting object recognition by using an apparatus for supporting object recognition, including the steps of: (a) the apparatus setting calculation blocks, each of which includes one or more pixels in an image, acquiring respective average values of the pixels included in the respective calculation blocks, and matching information on the respective calculation blocks with the respective average values or respective adjusted values derived from the respective average values; (b) the apparatus referring to information on windows, each of which includes information on one or more reference blocks which are different in at least either positions or sizes and information on corresponding relations between the calculation blocks and the average values or the adjusted values, to thereby assign the respective average values or the respective adjusted values to the respective reference blocks; and (c) the apparatus acquiring necessary information to be used for recognizing an object by using the respective average values or the respective adjusted values assigned to the respective reference blocks.

In accordance with another aspect of present invention, there is provided a method for supporting object recognition by using an apparatus for supporting object recognition, including the steps of: (a) the apparatus acquiring a test image as a test set; and (b) the apparatus recognizing an object included in the test image by referring to necessary information acquired through processes of: (1) setting calculation blocks, each of which includes one or more pixels in a training image acquired as a training set, acquiring respective average values of the pixels included in the respective calculation blocks, and matching information on the respective calculation blocks with the respective average values or respective adjusted values derived from the respective average values; (2) referring to information on windows, each of which includes information on one or more reference blocks which are different in at least either positions or sizes and information on corresponding relations between the calculation blocks and the average values or the adjusted values, to thereby assign the respective average values or the respective adjusted values to the respective reference blocks; and (3) acquiring the necessary information by using the respective average values or the respective adjusted values assigned to the respective reference blocks.

In accordance with still another aspect of present invention, there is provided an apparatus for supporting object recognition, including: a calculation block corresponding part for setting calculation blocks, each of which includes one or more pixels in an image, acquiring respective average values of the pixels included in the respective calculation blocks, and matching information on the respective calculation blocks with the respective average values or respective adjusted values derived from the respective average values; a reference block corresponding part for referring to information on windows, each of which includes information on one or more reference blocks which are different in at least either positions or sizes and information on corresponding relations between the calculation blocks and the average values or the adjusted values, to thereby assign the respective average values or the respective adjusted values to the respective reference blocks; and a comparing part for acquiring necessary information to be used for recognizing an object by using the respective average values or the respective adjusted values assigned to the respective reference blocks.

In accordance with still yet another aspect of present invention, there is provided an apparatus for supporting object recognition, including: an image acquiring part for acquiring a test image as a test set; and an object recognizing part for recognizing an object included in the test image by referring to necessary information acquired through processes of: (1) setting calculation blocks, each of which includes one or more pixels in a training image acquired as a training set, acquiring respective average values of the pixels included in the respective calculation blocks, and matching information on the respective calculation blocks with the respective average values or respective adjusted values derived from the respective average values; (2) referring to information on windows, each of which includes information on one or more reference blocks which are different in at least either positions or sizes and information on corresponding relations between the calculation blocks and the average values or the adjusted values, to thereby assign the respective average values or the respective adjusted values to the respective reference blocks; and (3) acquiring the necessary information by using the respective average values or the respective adjusted values assigned to the respective reference blocks.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
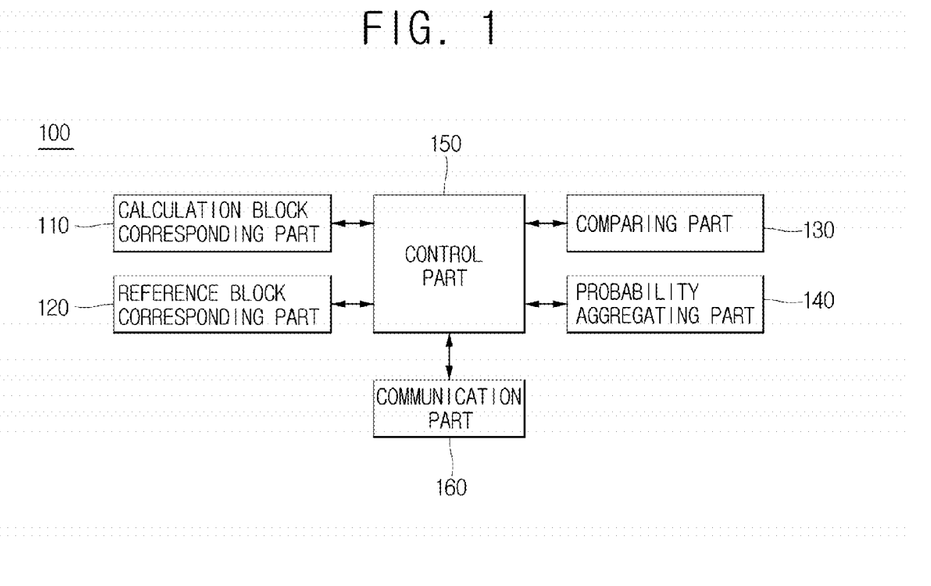
FIG. 1 is a block diagram illustrating a configuration of an apparatus for supporting object recognition in accordance with one example embodiment of the present invention.

To allow those skilled in the art to the present invention to be carried out easily, the example embodiments of the present invention by referring to attached diagrams will be explained in detail as follows:

FIG. 1 is a block diagram illustrating a configuration of an apparatus for supporting object recognition in accordance with one example embodiment of the present invention.

In accordance with the present invention, the meaning of "an apparatus for supporting object recognition" includes at least either of an apparatus for recognizing object and an apparatus for allowing other apparatus to recognize object.

Further, in accordance with the present invention, the meaning of "object recognition" includes not only "object recognition" itself but also "object detection".

By referring to FIG. 1, an apparatus 100 for supporting object recognition in accordance with one example embodiment of the present invention may include a calculation block corresponding part 110, a reference block corresponding part 120, a comparing part 130, a probability aggregating part 140, a control part 150, and a communication part 160.

Herein, mobile digital devices, including a personal computer (e.g., tablet PC, notebook, laptop, etc.), a PDA, a web pad, a mobile phone, a smart phone, etc. which have memory means and micro processors with a calculation ability, may be adopted as the apparatus 100 in accordance with one example embodiment of the present invention. Besides, an electronic calculator, which has a storage with a large capacity and at least one processor with a calculation ability, such as public computer including a workstation, a network server, or a home automation system, may be also adopted as the apparatus 100 in accordance with one example embodiment of the present invention. In addition, the calculation block corresponding part 110, the reference block corresponding part 120, the comparing part 130, and the probability aggregating part 140 to be explained later may be implemented as each electronic device with its own processor and support object recognition by transmitting and receiving data through communications among the calculation block corresponding part 110, the reference block corresponding part 120, the comparing part 130, and the probability aggregating part 140.

The apparatus 100 for supporting object recognition may be an apparatus for receiving images for learning, i.e., training sets, and then performing operations, e.g., learning processes, to the training sets or an apparatus for performing operations to test sets after processes of learning are completed, but for convenience in explanation, the apparatus 100 will be assumed as the apparatus for receiving the training sets and then performing operations to the training sets. In this case, the training sets obtained by the apparatus 100 may be used to increase object recognition rates which include face recognition rates. It may also be used to increase recognition rates with respect to other objects such as characters, etc., as the case may be.

First of all, the calculation block corresponding part 110 may set one or more calculation blocks including one or more pixels in an image, if being acquired by the apparatus 100. Herein, each of the calculation blocks is a virtual block for calculating each average value of the pixels included therein and each of the average values is assigned to each of reference blocks included in a window, which will be explained later. Each of the calculation block may be a square block, but it is not limited thereto. As another example, each of the calculation block may be a block with a certain shape if it could be combined with other block(s) with the certain shape to thereby make a square shape. Additionally, sizes of the calculation blocks may be set to be at least one of sizes 1×1, 2×2, 4×4, and 8×8, but it is not limited thereto.

Specifically, the calculation block corresponding part 110 may acquire at least one average value of one or more pixels included in at least one calculation block or at least one adjusted value derived from the average value. For example, the average value of the pixels means an average of intensity values of the pixels included in the calculation block. The average value may be simply acquired by using an integral image, which will be explained in more details later. Besides, the adjusted value may be either a value acquired by an arithmetic operation in use of the average value and a preset value or a value drawn by rounding off, rounding up, or rounding down the average value.

The calculation block corresponding part 110 may scan an image acquired by the apparatus 100 while changing ranges of pixels covered by the calculation blocks, and calculate the average values for the respective ranges of pixels or acquire the adjusted values derived from the average values. In addition, when the image acquired by the apparatus 100 is scanned with the calculation blocks, the calculation block corresponding part 110, for example, may perform scans per calculation block of sizes 1×1, 2×2, 4×4, and 8×8 and may store information on corresponding relations between information on the respective calculation blocks, i.e., information on identifiers of the calculation blocks, and information on the average values or the adjusted values derived from the average values. Herein, the identifiers of the calculation blocks may be given differently depending on an identifier of an image acquired by the apparatus 100, a size of a calculation block, and a position, i.e., a range, of pixels included in a calculation block. Besides, the sizes of the calculation blocks could be set to be matched with those of the reference blocks, which will be explained later.

The calculation block corresponding part 110 may calculate the average values or the adjusted values derived from the average values or receive the average values or the adjusted values from an external device or an external module. Unlike what was mentioned above, it could be implemented to configure a virtual average value block which stores the average values or the adjusted values and then make the average value or the adjusted value stored at a prefixed position in the average value block referred to through information on a corresponding calculation block.

Next, the reference block corresponding part 120 may perform a function of assigning the average values or the adjusted values, calculated by using the respective calculation blocks corresponding to respective reference blocks, to the corresponding reference blocks by referring to (i) information on windows including the reference blocks and (ii) information on the corresponding relations between the calculation blocks and the average values or the adjusted values. Herein, at least either positions or sizes in the respective reference blocks may be set differently.

For reference, a window may include information on one or more reference blocks with various sizes and positions, which will be used to perform object recognition. Herein, the reference blocks may serve as blocks for supporting the object recognition by being provided with average values or adjusted values calculated by using calculation blocks corresponding thereto. That is, the reference blocks may be considered as virtual blocks included in at least one window required to learn multiple training sets inputted into the apparatus 100.

Specifically, if a position and a size of a specific reference block among the multiple reference blocks in at least one window are matched with those of a specified calculation block among the calculation blocks (herein, "being matched" means a corresponding relations or equivalent thereto), an average value or an adjusted value corresponding to the specified calculation block may be matched with the specific reference block.

The reference block may be a square block, but it is not limited thereto. As another example, the reference block may be a block with a certain shape if it could be combined with other block(s) with the certain shape to thereby make a square shape. Additionally, a size of the reference block may be set to be at least one of sizes 1×1, 2×2, 4×4, and 8×8, but it is not limited thereto.

By referring to FIGS. 2 to 4, explanation on how to assign the average values or the adjusted values calculated by using the calculation blocks corresponding to the reference blocks to the corresponding reference blocks will be given below in accordance with one example embodiment of the present invention.

Figure 2:
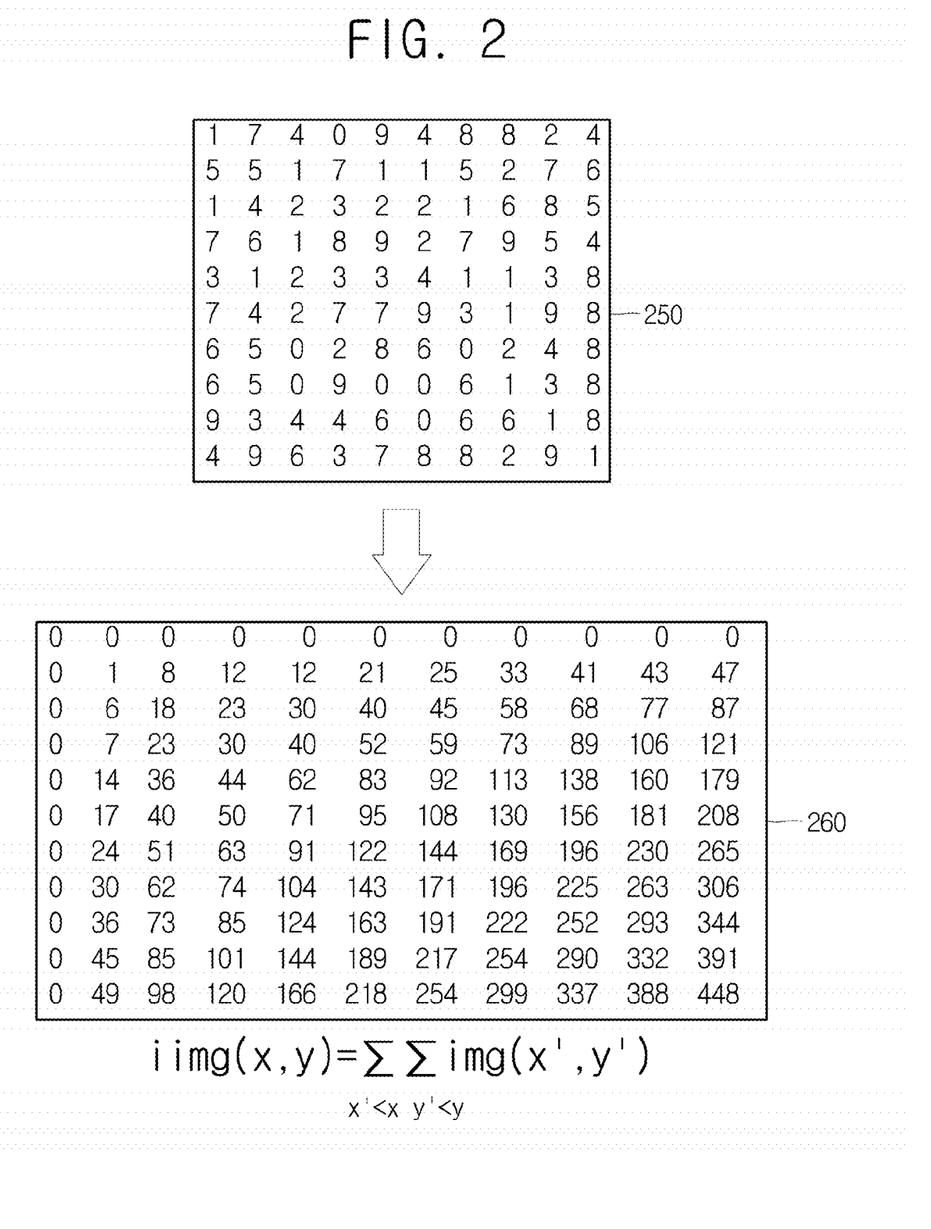
FIG. 2 is a drawing for showing an example of applying an integral image to calculate average values in accordance with an example embodiment of the present invention.

FIG. 2 is a drawing for explaining an example of creating an integral image 260 from an image 250 acquired by the apparatus 100. For reference, it is made clear that numbers in the image 250 may be intensity values of respective pixels and numbers in the first row and the first column in the integral image 260 are set to be 0 for convenience of calculation. Besides, it can be found in FIG. 3 that a calculation block 261 with a certain size is set on the integral image 260 of FIG. 2 and an average value of pixels included in the calculation block 261 can be easily acquired by using the integral image 260.

Figure 3:
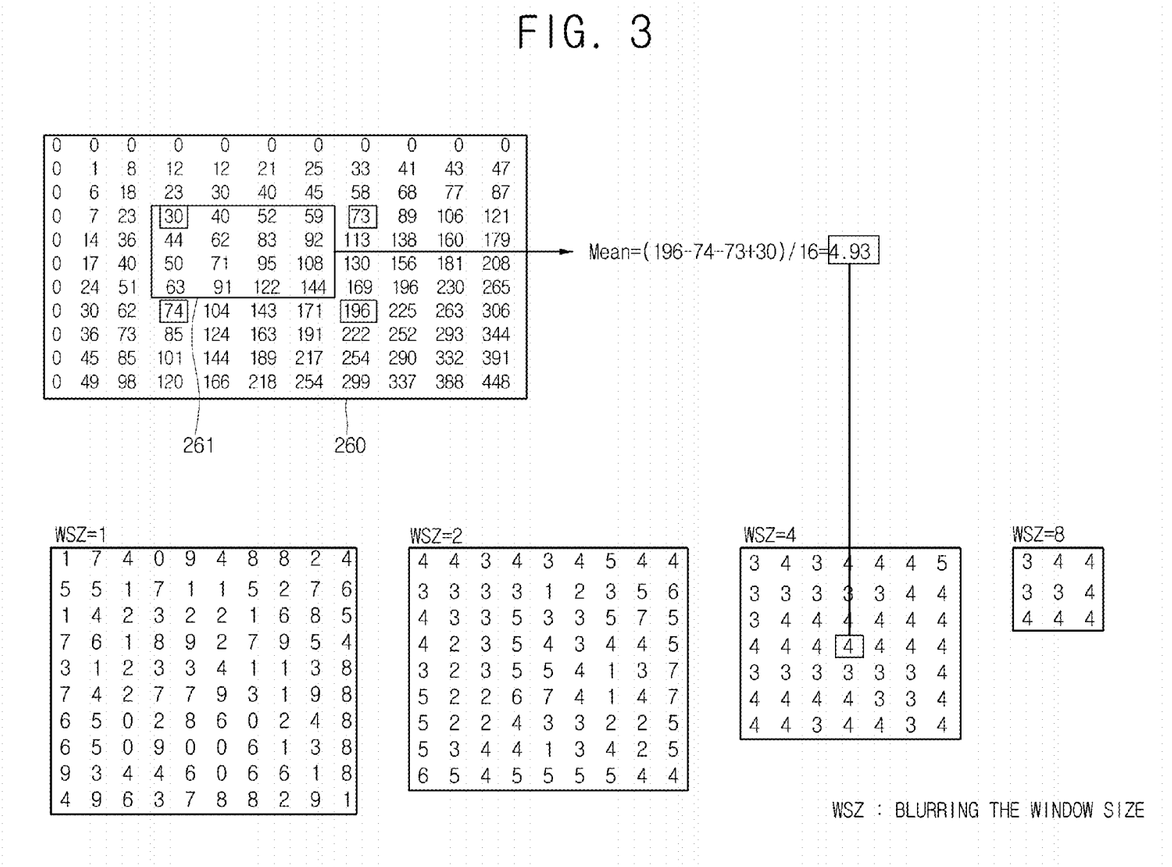
FIG. 3 is a drawing for representing an example of performing the calculation of an average value in accordance with an example embodiment of the present invention.

Specifically, to get the average value of the pixels included in the calculation block 261, calculation could be made by referring to four pixel values of four points (indicated by small boxes) in the integral image 260 as shown in FIG. 3. It could be found that the average value of the calculation block 261 as such is 4.93 and that, as the adjusted value acquired by rounding down the average value, 4 is drawn. In other words, as the size of the calculation block 261 is 4×4, and the coordinates of the top-left pixel among the pixels in the calculation block 261 are (4, 4), it can be found that "4" as the adjusted value is allocated to a small box located in the coordinates (4, 4) in the figure for WSZ=4 among the lower figures of FIG. 3. For reference, this is introduced on assumption that the coordinates of the top-left pixel among the pixels in the calculation block of size 4×4 are (4, 4). However, for example, if the size of the calculation block is 2×2 and the coordinates of the top-left pixel among the pixels in the calculation block correspond to (3, 3), it could be found that "3" can be allocated as the adjusted value to the position of the coordinates (3, 3) in the figure for WSZ=2 among the lower figures of FIG. 3. For reference, the aforementioned cases were explained as examples that the average values or the adjusted values are assigned based on the top-left pixel among the pixels in the calculation block 261, but these were for convenience of explanation, and a variety of variations may be introduced as well.

During the course of drawing the average value or the adjusted value by using the calculation block with the position and the size as shown in FIG. 3, if an integral image as shown in FIG. 2 is used, the amount of calculation may decrease, but the integral image is not always necessary because the technical idea of the present invention to be explained later is maintained as it is even though the average value or the adjusted value is acquired without any integral image.

Figure 4:
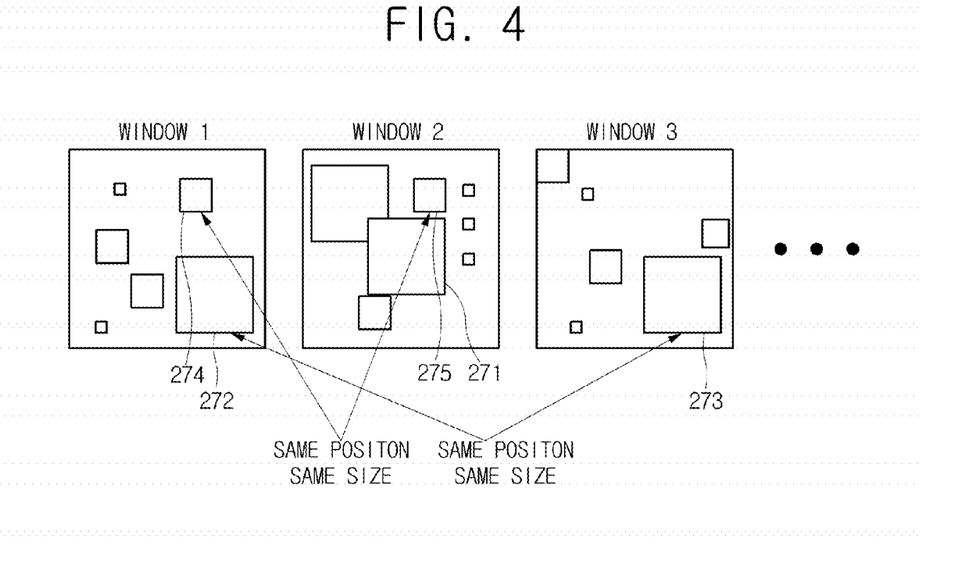
FIG. 4 is a diagram for explaining how to handle reference blocks with a same size at a same relative position in multiple windows in accordance with an example embodiment of the present invention.

FIG. 4 shows that respective multiple reference blocks included in respective windows have various sizes at various positions in accordance with the present invention.

Specifically, it is assumed that a size and a relative position of a reference block 271 in a window 2 of FIG. 4 are matched with those of the calculation block 261 in FIG. 3. That is, it is assumed that the sizes of both the reference block 271 and the calculation block 261 are 4×4 and the coordinates of the top-left of the reference block 271 are coincident with those of the calculation block 261. In this case, a value "4" acquired by the calculation block 261 could be allocated to the reference block 271. As such, average values or adjusted values calculated by using the respective calculation blocks as shown in FIG. 3 may be allocated to respective reference blocks corresponding to the respective calculation blocks, and necessary information (e.g., long code, short code, recognition rates, etc.) to be used for recognizing an object could be acquired by successively comparing every two values corresponding to all the possible respective pairs which can be selected among all the pixel values allocated to the reference blocks. Surely, even the information on the successive comparison could be regarded as the necessary information, which will be explained in more details later.

Again, by referring to FIG. 4, although a reference block 272 and a reference block 273 belong to different windows, since the reference block 272 and the reference block 273 exist with a same size at a same relative position (e.g., with a same range of pixels) in each window, a value calculated by the calculation block as shown in FIG. 3 may be allocated to both the reference block 272 and the reference block 273 equally or at the same time as the case may be. This may be applied even to a reference block 274 and a reference block 275, which exist with a same size at a same relative position in their corresponding windows even though they belong to different windows. In general, a tremendous amount of windows are required to enhance a degree of accuracy in the learning process. However, in accordance with the present invention, since it is natural that there are a lot of reference blocks with a same size at a same relative position in a tremendous amount of windows and that an identical value can be allotted to the reference blocks with a same size at a same relative position at a time, it is possible to perform the learning process very quickly to thereby enhance the degree of accuracy in the object recognition.

FIGS. 5 to 8 are drawings for explaining the course of acquiring necessary information, i.e., information to be used for recognizing an object, from an image (e.g., a training set) acquired by the apparatus 100 in more details in accordance with one example embodiment of the present invention.

Figure 5:
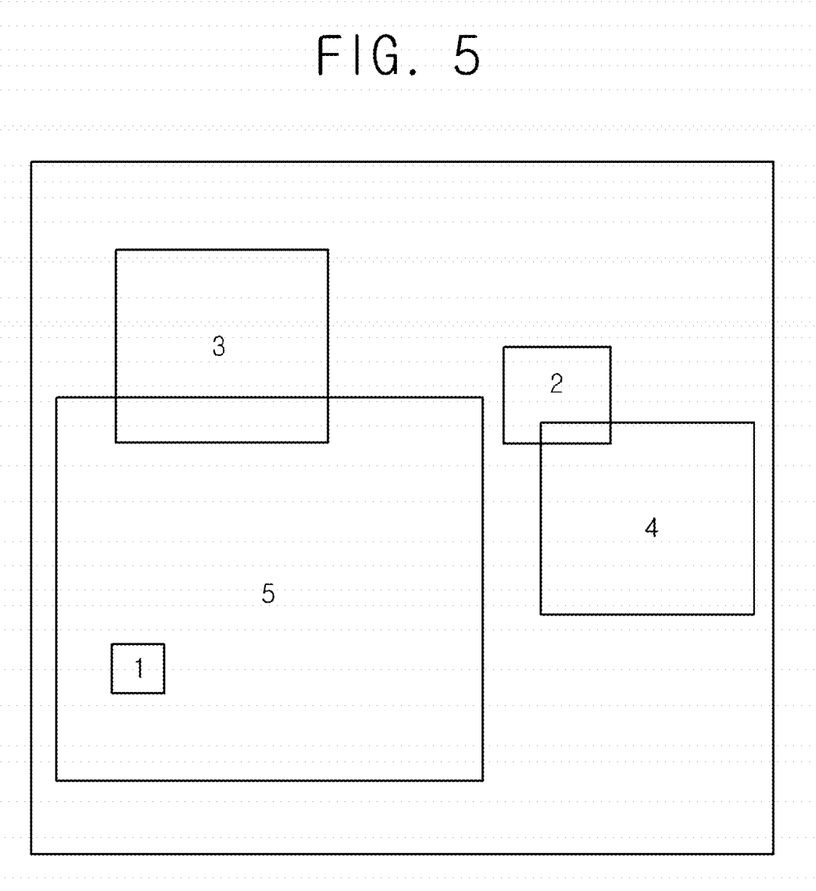
FIG. 5 is a drawing for illustrating multiple reference blocks included in a window in accordance with an example embodiment of the present invention.

FIG. 5 represents multiple reference blocks belonging to one window in accordance with one example embodiment of the present invention.

By referring to FIG. 5, it could be found that the multiple reference blocks are different in at least either position or size.

In addition, the multiple reference blocks in FIG. 5 include a first reference block of size 1×1, a second one of size 2×2, third and fourth ones of size 4×4, and a fifth one of size 8×8.

As explained above, the calculation block corresponding part 110 may set calculation blocks (not illustrated), whose sizes and positions are matched with various sizes and positions of the multiple reference blocks, on an image (e.g., a training set) acquired by the apparatus 100, and acquire respective average values of the pixels included in the respective calculation blocks or respective adjusted values calculated by using the respective average values; and the reference block corresponding part 120 may match the respective average values or the respective adjusted values with the respective reference blocks corresponding to the respective calculation blocks.

Figure 6:
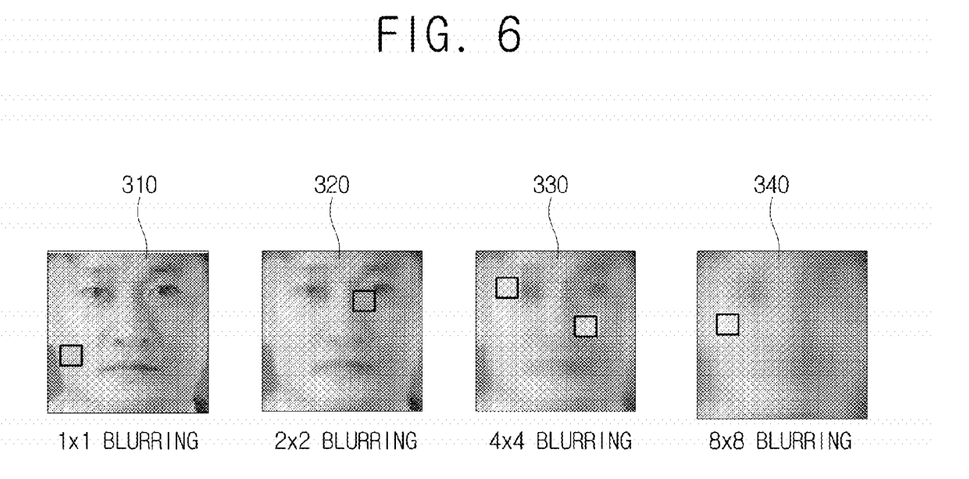
FIG. 6 is a diagram indicating respective top-left pixels in the reference blocks of FIG. 5 on respective blurred images, which are acquired by applying blurring processes to an acquired image by using different sizes of calculation blocks, respectively, in accordance with an example embodiment of the present invention.

As such, the course of setting calculation blocks on an original image, i.e., a training image, acquired by the apparatus 100 and acquiring the average values, etc. by using the set calculation blocks can be regarded as a course of applying average filters to the original image so that the original image may be blurred. By referring to FIG. 6, the far-left image, for example, shows an image at a state of applying a calculation block of size 1×1 to the original image and the state of the far-left image is shown to be same as the original image because there is no blurring caused by the calculation block of size 1×1. In addition, the second image from the left in FIG. 6 represents an image at a state of applying a calculation block of size 2×2 to the original image and the third image from the left in FIG. 6 shows an image at a state of applying a calculation block of size 4×4 thereto while the far-right image in FIG. 6 represents an image at a state of applying a calculation block of size 8×8 thereto. In short, it could be found that the degree of blurring becomes greater from the left image to the right one in FIG. 6.

For example, representatively given the explanation on the far-right image in FIG. 6, it can be found that the average values or the adjusted values, which are acquired by using the calculation blocks of size 8×8, i.e., acquired while moving a calculation block of size 8×8 from top-left to bottom-right of the original image, are displayed. The respective average values or the respective adjusted values may be assigned to all reference blocks of size 8×8 which are located at respective corresponding relative positions in the respective windows. Because this explanation could be applied even to blocks of sizes 1×1, 2×2 and 4×4 in FIG. 6, explanation thereon will be omitted.

By referring to FIGS. 5 and 6 again, the reference block corresponding part 120 may find a calculation block whose position and size are matched with those of the first reference block of size 1×1 in FIG. 5 in the far-left image of FIG. 6, and allocate an average value or an adjusted value calculated by using the calculation block to the first reference block; find a calculation block whose position and size are matched with those of the second reference block of size 2×2 in FIG. 5 in the second left image of FIG. 6, and allocate an average value or an adjusted value calculated by using the calculation block to the second reference block; find calculation blocks whose positions and sizes are matched with those of the third reference block of size 4×4 and the fourth reference block of size 4×4, respectively, in FIG. 5 in the third left image of FIG. 6, and allocate respective average values or respective adjusted values calculated by using the respective calculation blocks to the third reference block and the fourth reference block; find a calculation block whose position and size are matched with those of the fifth reference block of size 8×8 in FIG. 5 in the far-right image of FIG. 6, and allocate an average value or an adjusted value calculated by using the calculation block to the fifth reference block.

By such processes, intensity values, i.e., the average values, may be allocated to the respective reference blocks, i.e., the first to the fifth reference blocks illustrated in FIG. 5. The values allocated as such may be used to acquire necessary information to be used for recognizing an object, which will be explained by referring to FIGS. 7 and 8.

Again by referring to FIG. 1, the comparing part 130 may acquire the necessary information by referring to the respective average values or the respective adjusted values assigned to the respective reference blocks.

In particular, if there are n windows, i.e., a first to an n-th windows, the comparing part 130 may acquire information on respective results of comparison, i.e., results acquired by successively comparing every two values corresponding to all the possible respective pairs which can be selected among all the average values (or among all the adjusted values) allocated to the reference blocks with respect to the respective windows as the necessary information. At the time, each of the results of the comparison may be acquired by each window.

Figure 7:
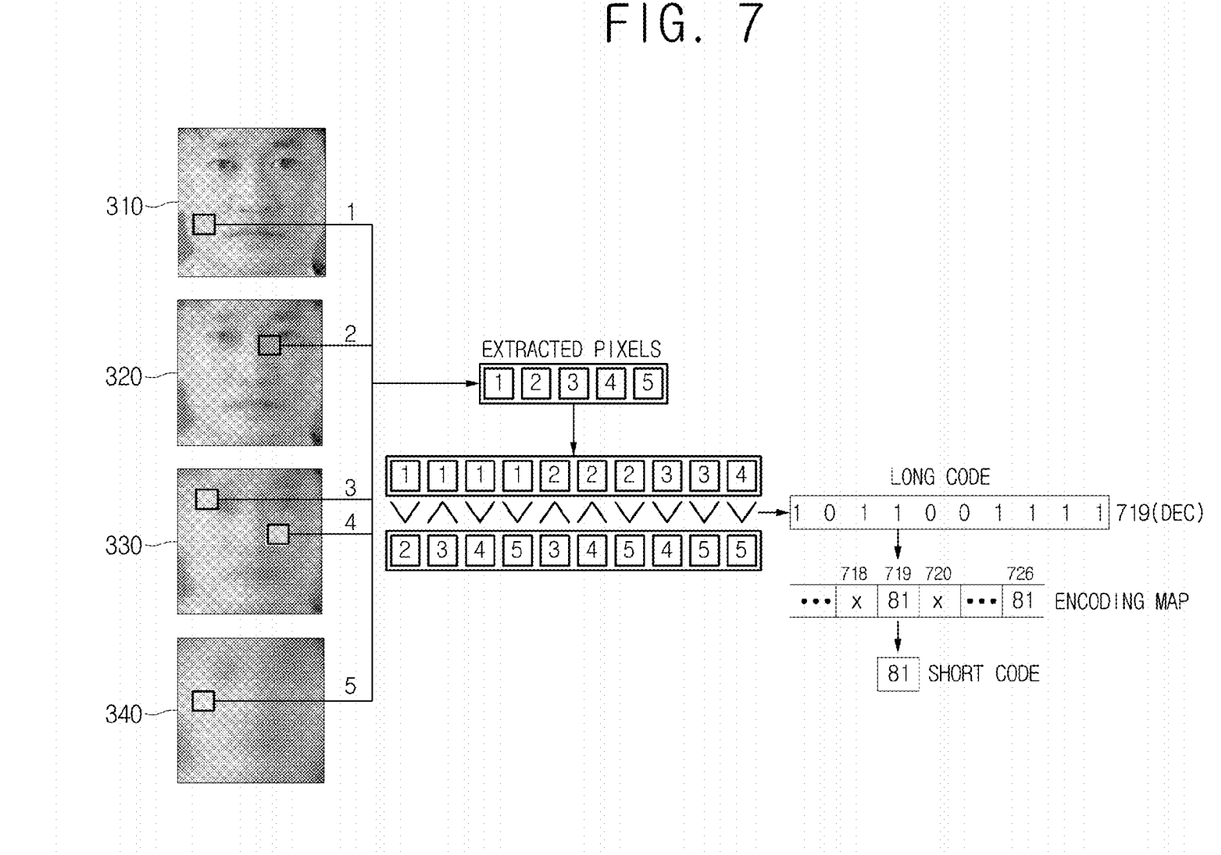
FIG. 7 is a drawing for explaining a course of acquiring a long code and a short code by successively comparing two values of all the respective pairs of pixels which can be selected among all the pixels in the small boxes of FIG. 6 in accordance with an example embodiment of the present invention.
Figure 8:
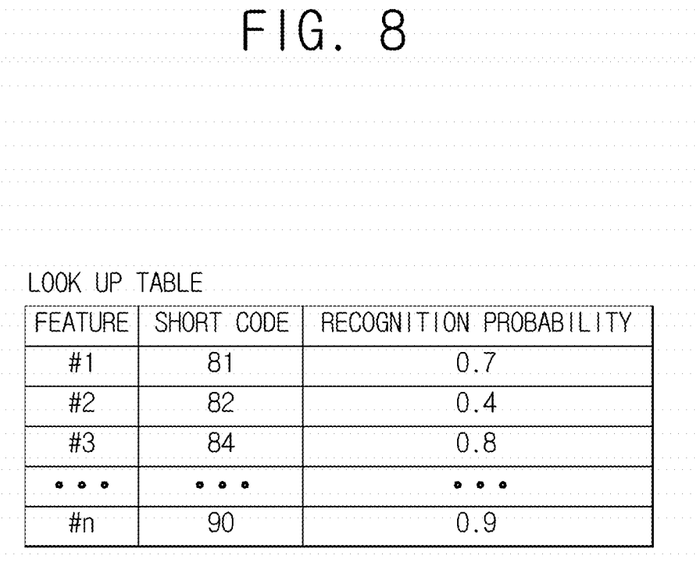
FIG. 8 illustrates a lookup table which stores corresponding relations between short codes and recognition rates in accordance with an example embodiment of the present invention.

Specifically, by referring to FIG. 7, it could be found that images 310, 320, 330, and 340 of FIG. 7 are identical to the images 310, 320, 330, and 340 as shown in FIG. 6 and even the positions of small boxes in the respective images 310, 320, 330, and 340 are identical to those in the images 310, 320, 330, and 340. Exemplarily, the positions of small boxes were indicated by being matched with those of the top-left pixels of the respective reference blocks, but they are not always limited thereto. For reference, the visible indication of such small boxes may be nothing but for understanding. That is, the average values allocated as shown above at coordinates corresponding to the small boxes could be recorded with no visible indication.

By referring to both FIGS. 5 and 7, as a size of the first reference block in FIG. 5 is 1×1, a small box was indicated at the corresponding position in the image 310 of FIG. 7 as it was and an average value (e.g., an intensity value) assigned to the first reference block was recorded with information on the coordinates of the small box of the image 310. Similarly, as a size of the second reference block of FIG. 5 is 2×2, a small box was indicated at the corresponding position in the image 320 of FIG. 7 (e.g., the position of the top-left pixel of the second reference block) as it was and an average value assigned to the second reference block was recorded with information on the coordinates of the small box of the image 320. Because explanation even on the third to the fifth blocks of FIG. 5 is similar to these, detailed explanation thereon will be omitted.

Again by referring to FIG. 7, if the small boxes indicated in the images 310, 320, 330, and 340 are numbered respectively from 1 to 5 and they are regarded as pixels extracted from the images 310, 320, 330, and 340, the comparing part 130 shows that every two values corresponding to all the possible respective pairs which can be selected among all the pixel values are successively compared to acquire the necessary information, i.e., information to be used for recognizing an object.

Specifically, as explained above, the average values or the adjusted values calculated by using the respective calculation blocks are allocated to the respective reference blocks included in the windows. The comparing part 130 may successively compare average values or adjusted values allocated to reference blocks included in a window and then successively compare average values or adjusted values allocated to reference blocks included in a next window and the like. At the time, if there are n reference blocks belonging to a window, a number of cases of extracting two, as subjects to be compared, from n is $_nC_2$. If a code representing results acquired by comparing $_nC_2$ times in a binary format is called as a long code, the range of the long code becomes [0, $2^{(_nC_2)}-1$] where "$2^{(_nC_2)}-1$" means 2 to the power of $(_nC_2)-1$.

By referring to signs of inequality illustrated just next to the right of the images 310, 320, 330, and 340 in FIG. 7, it could be found that results of comparison acquired by successively comparing all the possible respective pairs which can be selected among all the five extracted pixel values were displayed and that pixel numbers were indicated in the respective rectangular boxes arranged on the upper and the lower columns to indicate identities of the respective pairs for convenience. Accordingly, if a pixel in the upper column receives a larger value than a pixel in the lower column, "1" was allowed to be indicated in the long code illustrated on FIG. 7 and if a pixel in the lower column receives a larger value than a pixel in the upper column, "0" was allowed to be indicated in the long code. In addition, the comparing part 130 may get a short code from the long code. Because the range of the long code is wide and most of the values of the long code are not effective, it may pre-obtain a mapping function Φ for mapping only the effective values in the long code to the short code in a sequential order. It may be called as an encoding map and expressed as follows:

$$\Phi: \{x | 0 \leq x \leq 2^{N_{C_2}} - 1, x \in \mathbb{N}_0\} \to \{x | 0 \leq x \leq N! - 1, x \in \mathbb{N}_0\}$$

An example of being converted into the short code is illustrated on the bottom-right of FIG. 7. For reference, if there are N reference blocks, the ranges of the short code may be [0, N!−1] because the number of cases that may occur when N pieces are listed in order is $_N P_N$.

By referring to FIG. 1 again, the probability aggregating part 140 may acquire recognition probability values as the necessary information by each window, e.g., the first to the n-th windows. Specifically, the probability aggregating part 140 acquires the respective recognition probability values corresponding to the respective short codes calculated by using the respective windows by referring to a lookup table such as FIG. 8. Next, the probability aggregating part 140 may aggregate the recognition probability values and thus acquire the aggregated probability values as ultimate recognition probability values derived from the first to the n-th windows. Of course, when a recognition probability value becomes larger, it can be evaluated that an object recognition rate becomes higher.

The control part 150 performs a function of controlling data flow among the calculation block corresponding part 110, the reference block corresponding part 120, the comparing part 130, the probability aggregating part 140, and the communication part 160. In other words, the control part 150 controls the flow of data from or to outside or among the components of the apparatus 100 for supporting object recognition and thereby allows the calculation block corresponding part 110, the reference block corresponding part 120, the comparing part 130, the probability aggregating part 140, and the communication part 160 to perform their unique functions.

The communication part 160 performs a function of allowing the apparatus 100 for supporting object recognition to communicate with other external devices or modules. The communication part 160 may acquire the image, the average values, or the necessary information through the communications with the external devices or the external modules.

Figure 9:
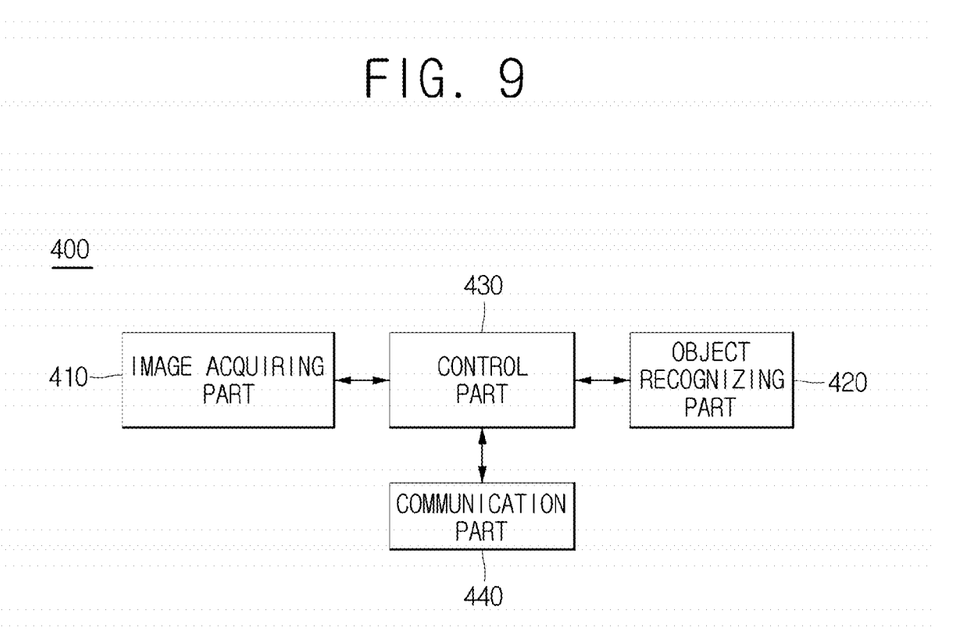
FIG. 9 is a block diagram of an apparatus for supporting object recognition in accordance with another example embodiment of the present invention.

FIG. 9 is a block diagram of an apparatus 400 for supporting object recognition in accordance with another example embodiment of the present invention.

By referring to FIG. 9, the apparatus 400 for supporting object recognition in accordance with another example embodiment of the present invention includes an image acquiring part 410, an object recognizing part 420, a control part 430, and a communication part 440. For reference, the apparatus 400 may be an apparatus for recognizing an object included in an image (i.e., a test set) acquired after the learning process is completed.

The image acquiring part 410 may acquire an image, i.e., a test image, as a test set. For this end, the image acquiring part 410 may further include a photographing part (not illustrated) for photographing an object. Surely, it would be possible to acquire an image from an external device or module through the communication part 440 as well.

The apparatus 400 may recognize an object included in the test image by referring to necessary information acquired through processes of: (1) setting calculation blocks, each of which includes one or more pixels in a training image acquired as a training set, acquiring respective average values of the pixels included in the respective calculation blocks, and matching information on the respective calculation blocks with the respective average values or respective adjusted values derived from the respective average values; (2) referring to information on windows, each of which includes information on one or more reference blocks which are different in at least either positions or sizes and information on corresponding relations between the calculation blocks and the average values or the adjusted values, to thereby assign the respective average values or the respective adjusted values to the respective reference blocks; and (3) acquiring the necessary information by using the respective average values or the respective adjusted values assigned to the respective reference blocks.

The control part 430 performs a function of controlling data flow among the image acquiring part 410, the object recognizing part 420, and the communication part 440. In short, the control part 430 controls the flow of data from or to outside or among the components of the apparatus 400 for supporting object recognition and thereby allows the image acquiring part 410, the object recognizing part 420, and the communication part 440 to perform their unique functions.

The communication part 440 performs a function of allowing the apparatus 400 for supporting object recognition to communicate with other external devices or modules. The communication part 440 may acquire the image, the average values, or the necessary information through the communications with external devices or modules.

The present invention can have a better classification performance compared to other binary features.

In addition, the present invention can have an effect of higher calculation speed compared to features such as Gabor or HOG.

Besides, the present invention can be used effectively for single-class learning and multi-class learning.

Additionally, the present invention can be used effectively for samples with a lot of variations.

Moreover, the present invention can reduce a chance of overfitting on learning samples compared to local features.

Furthermore, the present invention can model a classifier by using smaller number of weak classifiers.

As well, the present invention can have an effect of using smaller number of points compared to Ferns.

The embodiments of the present invention may be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variation equal or equivalent to the patent claims pertain to the category of the thought of the present invention.

What is claimed is:

1. A method for supporting object recognition by using an apparatus for supporting object recognition, comprising the steps of:
   (a) the apparatus setting calculation blocks, each of which includes one or more pixels in an image, acquiring respective average values of the pixels included in the respective calculation blocks, and matching information on the respective calculation blocks with the respective average values or respective adjusted values derived from the respective average values;
   (b) the apparatus referring to information on windows, each of which includes information on one or more reference blocks which are different in at least either positions or sizes and information on corresponding relations between the calculation blocks and the average values or the adjusted values, to thereby assign the respective average values or the respective adjusted values to the respective reference blocks; and
   (c) the apparatus acquiring necessary information to be used for recognizing an object by using the respective average values or the respective adjusted values assigned to the respective reference blocks,
   wherein the windows include a first to an n-th windows; and wherein, at the step (b), the respective average values or the respective adjusted values are assigned to the respective reference blocks by each window from the first to the n-th ones by referring to the information on the reference blocks belonging to the respective n windows and the information on corresponding relations between the calculation blocks and the average values or the adjusted values
   wherein, at the step (b), on assumption that multiple reference blocks belonging to the respective windows from the first to the n-th ones are called as a first reference block group to an n-th reference block group, if there is a first reference block with a certain size at a certain relative position in a window and there is a second reference block with the certain size at the certain relative position in another window, the apparatus assigns a corresponding average value or a corresponding adjusted value to the first and the second reference blocks.

2. The method of claim 1, wherein, at the step (a), the apparatus acquires the respective average values of the pixels included in the respective calculation blocks or the respective adjusted values by referring to an integral image calculated by using pixel values in the image.

3. The method of claim 1, wherein each of the adjusted values is a value acquired by an arithmetic operation in use of the corresponding average value and a corresponding preset value or a value drawn by rounding off, rounding up, or rounding down the corresponding average value.

4. The method of claim 1, wherein each of the calculation blocks and each of the reference blocks is a square block or a block with a certain shape if it could be combined with other block(s) with the certain shape to thereby make a square shape.

5. The method of claim 1, wherein the recognized object is at least one of a thing, a face of a human being, and a character.

6. A method for supporting object recognition by using an apparatus for supporting object recognition, comprising the steps of:
   (a) the apparatus setting calculation blocks, each of which includes one or more pixels in an image, acquiring respective average values of the pixels included in the respective calculation blocks, and matching information on the respective calculation blocks with the respective average values or respective adjusted values derived from the respective average values;
   (b) the apparatus referring to information on windows, each of which includes information on one or more reference blocks which are different in at least either positions or sizes and information on corresponding relations between the calculation blocks and the average values or the adjusted values, to thereby assign the respective average values or the respective adjusted values to the respective reference blocks; and
   (c) the apparatus acquiring necessary information to be used for recognizing an object by using the respective average values or the respective adjusted values assigned to the respective reference blocks,
   wherein, at the step (b), if a position and a size of a specific reference block among the multiple reference blocks belonging to a window are identical to those of a specified calculation block among the calculation blocks, a particular average value or a particular adjusted value acquired by using the specified calculation block is assigned to the specific reference block.

7. A method for supporting object recognition by using an apparatus for supporting object recognition, comprising the steps of:
   (a) the apparatus setting calculation blocks, each of which includes one or more pixels in an image, acquiring respective average values of the pixels included in the respective calculation blocks, and matching information on the respective calculation blocks with the respective average values or respective adjusted values derived from the respective average values;
   (b) the apparatus referring to information on windows, each of which includes information on one or more reference blocks which are different in at least either positions or sizes and information on corresponding relations between the calculation blocks and the average values or the adjusted values, to thereby assign the respective average values or the respective adjusted values to the respective reference blocks; and
   (c) the apparatus acquiring necessary information to be used for recognizing an object by using the respective average values or the respective adjusted values assigned to the respective reference blocks,
   wherein the windows include a first to an n-th windows; and wherein, at the step (b), the respective average values or the respective adjusted values are assigned to the respective reference blocks by each window from the first to the n-th ones by referring to the information on the reference blocks belonging to the respective n windows and the information on corresponding relations between the calculation blocks and the average values or the adjusted values,
   wherein, at the step (c), information on respective results of comparison acquired by successively comparing every two values corresponding to all the possible respective pairs which can be selected among all the average values or among all the adjusted values allocated to the reference blocks by each window is acquired as the necessary information.

8. The method of claim 7, wherein, at the step (c), a long code representing the results acquired by comparing nC2 times in a binary form is acquired by each window as the necessary information.

9. The method of claim 8, wherein, at the step (c), a short code is acquired as the necessary information by mapping only the effective values in the long code to the short code in a sequential order.

10. The method of claim 7, further comprising the step of:
(d) the apparatus acquiring recognition probability values as the necessary information by each window.

11. A method for supporting object recognition by using an apparatus for supporting object recognition, comprising the steps of:
(a) the apparatus acquiring a test image as a test set; and
(b) the apparatus recognizing an object included in the test image by referring to necessary information acquired through processes of: (1) setting calculation blocks, each of which includes one or more pixels in a training image acquired as a training set, acquiring respective average values of the pixels included in the respective calculation blocks, and matching information on the respective calculation blocks with the respective average values or respective adjusted values derived from the respective average values; (2) referring to information on windows, each of which includes information on one or more reference blocks which are different in at least either positions or sizes and information on corresponding relations between the calculation blocks and the average values or the adjusted values, to thereby assign the respective average values or the respective adjusted values to the respective reference blocks; and (3) acquiring the necessary information by using the respective average values or the respective adjusted values assigned to the respective reference blocks,
wherein the windows include a first to an n-th windows; and wherein, at the process (2), the respective average values or the respective adjusted values are assigned to the respective reference blocks by each window from the first to the n-th ones by referring to the information on the reference blocks belonging to the respective n windows and the information on corresponding relations between the calculation blocks and the average values or the adjusted values,
wherein, at the process (2), on assumption that multiple reference blocks belonging to the respective windows from the first to the n-th ones are called as a first reference block group to an n-th reference block group, if there is a first reference block with a certain size at a certain relative position in a window and there is a second reference block with the certain size at the certain relative position in another window, the apparatus assigns a corresponding average value or a corresponding adjusted value to the first and the second reference blocks.

12. An apparatus for supporting object recognition, comprising:
a calculation block corresponding part for setting calculation blocks, each of which includes one or more pixels in an image, acquiring respective average values of the pixels included in the respective calculation blocks, and matching information on the respective calculation blocks with the respective average values or respective adjusted values derived from the respective average values;
a reference block corresponding part for referring to information on windows, each of which includes information on one or more reference blocks which are different in at least either positions or sizes and information on corresponding relations between the calculation blocks and the average values or the adjusted values, to thereby assign the respective average values or the respective adjusted values to the respective reference blocks; and
a comparing part for acquiring necessary information to be used for recognizing an object by using the respective average values or the respective adjusted values assigned to the respective reference blocks,
wherein the windows include a first to an n-th windows; and wherein the reference block corresponding part assigns the respective average values or the respective adjusted values to the respective reference blocks by each window from the first to the n-th ones by referring to the information on the reference blocks belonging to the respective n windows and the information on corresponding relations between the calculation blocks and the average values or the adjusted values,
wherein, on assumption that multiple reference blocks belonging to the respective windows from the first to the n-th ones are called as a first reference block group to an n-th reference block group, if there is a first reference block with a certain size at a certain relative position in a window and there is a second reference block with the certain size at the certain relative position in another window, the reference block corresponding part assigns a corresponding average value or a corresponding adjusted value to the first and the second reference blocks.

13. The apparatus of claim 12, wherein the calculation block corresponding part acquires the respective average values of the pixels included in the respective calculation blocks or the respective adjusted values by referring to an integral image calculated by using pixel values in the image.

14. The apparatus of claim 12, wherein each of the adjusted values is a value acquired by an arithmetic operation in use of the corresponding average value and a corresponding preset value or a value drawn by rounding off, rounding up, or rounding down the corresponding average value.

15. The apparatus of claim 12, wherein each of the calculation blocks and each of the reference blocks is a square block or a block with a certain shape if it could be combined with other block(s) with the certain shape to thereby make a square shape.

16. The apparatus of claim 12, wherein the recognized object is at least one of a thing, a face of a human being, and a character.

17. An apparatus for supporting object recognition, comprising:
a calculation block corresponding part for setting calculation blocks, each of which includes one or more pixels in an image acquiring respective average values of the pixels included in the respective calculation blocks, and matching information on the respective calculation blocks with the respective average values or respective adjusted values derived from the respective average values;
a reference block corresponding part for referring to information on windows, each of which includes information on one or more reference blocks which are different in at least either positions or sizes and information on corresponding relations between the calculation blocks and the average values or the adjusted values, to thereby assign the respective average values or the respective adjusted values to the respective reference blocks; and a comparing art for acquiring necessary information to be used for recognizing an object by using the respective average values or the respective adjusted values assigned to the respective reference blocks, wherein, if a position and a size of a specific reference block among the multiple reference blocks belonging to a window are identical to those of a specified calculation block among the calculation blocks, the reference block corresponding part assigns a particular average value or a particular adjusted value acquired by using the specified calculation block to the specific reference block.

18. An apparatus for supporting object recognition, comprising:

a calculation block corresponding part for setting calculation blocks, each of which includes one or more pixels in an image, acquiring respective average values of the pixels included in the respective calculation blocks, and matching information on the respective calculation blocks with the respective average values or respective adjusted values derived from the respective average values;

a reference block corresponding part for referring to information on windows, each of which includes information on one or more reference blocks which are different in at least either positions or sizes and information on corresponding relations between the calculation blocks and the average values or the adjusted values, to thereby assign the respective average values or the respective adjusted values to the respective reference blocks; and a comparing part for acquiring necessary information to be used for recognizing an object by using the respective average values or the respective adjusted values assigned to the respective reference blocks, wherein the windows include a first to an n-th windows; and wherein the reference block corresponding part assigns the respective average values or the respective adjusted values to the respective reference blocks by each window from the first to the n-th ones by referring to the information on the reference blocks belonging to the respective n windows and the information on corresponding relations between the calculation blocks and the average values or the adjusted values, wherein the comparing part acquires information on respective results of comparison acquired by successively comparing every two values corresponding to all the possible respective pairs which can be selected among all the average values or among all the adjusted values allocated to the reference blocks by each window as the necessary information.

19. The apparatus of claim 18, wherein the comparing part acquires a long code representing the results acquired by comparing nC2 times in a binary form by each window as the necessary information.

20. The apparatus of claim 19, wherein the comparing part acquires a short code as the necessary information by mapping only the effective values in the long code to the short code in a sequential order.

21. The apparatus of claim 18, further comprising: a probability aggregating part for acquiring recognition probability values as the necessary information by each window.

22. An apparatus for supporting object recognition, comprising:

an image acquiring part for acquiring a test image as a test set; and an object recognizing part for recognizing an object included in the test image by referring to necessary information acquired through processes of: (1) setting calculation blocks, each of which includes one or more pixels in a training image acquired as a training set, acquiring respective average values of the pixels included in the respective calculation blocks, and matching information on the respective calculation blocks with the respective average values or respective adjusted values derived from the respective average values; (2) referring to information on windows, each of which includes information on one or more reference blocks which are different in at least either positions or sizes and information on corresponding relations between the calculation blocks and the average values or the adjusted values, to thereby assign the respective average values or the respective adjusted values to the respective reference blocks; and (3) acquiring the necessary information by using the respective average values or the respective adjusted values assigned to the respective reference blocks, wherein the windows include a first to an n-th windows; and wherein, at the process (2), the respective average values or the respective adjusted values are assigned to the respective reference blocks by each window from the first to the n-th ones by referring to the information on the reference blocks belonging to the respective n windows and the information on corresponding relations between the calculation blocks and the average values or the adjusted values wherein, at the process (2), on assumption that multiple reference blocks belonging to the respective windows from the first to the n-th ones are called as a first reference block group to an n-th reference block group, if there is a first reference block with a certain size at a certain relative position in a window and there is a second reference block with the certain size at the certain relative position in another window, the apparatus assigns a corresponding average value or a corresponding adjusted value to the first and the second reference blocks.

23. A method for supporting object recognition by using an apparatus for supporting object recognition, comprising the steps of:

(a) the apparatus acquiring a test image as a test set; and (b) the apparatus recognizing an object included in the test image by referring to necessary information acquired through processes of: (1) setting calculation blocks, each of which includes one or more pixels in a training image acquired as a training set, acquiring respective average values of the pixels included in the respective calculation blocks, and matching information on the respective calculation blocks with the respective average values or respective adjusted values derived from the respective average values; (2) referring to information on windows, each of which includes information on one or more reference blocks which are different in at least either positions or sizes and information on corresponding relations between the calculation blocks and the average values or the adjusted values, to thereby assign the respective average values or the respective adjusted values to the respective reference blocks; and (3) acquiring the necessary information by using the respective average values or the respective adjusted values assigned to the respective reference blocks, wherein, at the process (2), if a position and a size of a specific reference block among the multiple reference blocks belonging to a window are identical to those of a specified calculation block among the calculation blocks, a particular average value or a particular adjusted value acquired by using the specified calculation block is assigned to the specific reference block.

24. A method for supporting object recognition by using an apparatus for supporting object recognition, comprising the steps of:
- (a) the apparatus acquiring a test image as a test set; and
- (b) the apparatus recognizing an object included in the test image by referring to necessary information acquired through processes of: (1) setting calculation blocks, each of which includes one or more pixels in a training image acquired as a training set, acquiring respective average values of the pixels included in the respective calculation blocks, and matching information on the respective calculation blocks with the respective average values or respective adjusted values derived from the respective average values; (2) referring to information on windows, each of which includes information on one or more reference blocks which are different in at least either positions or sizes and information on corresponding relations between the calculation blocks and the average values or the adjusted values, to thereby assign the respective average values or the respective adjusted values to the respective reference blocks; and (3) acquiring the necessary information by using the respective average values or the respective adjusted values assigned to the respective reference blocks, wherein the windows include a first to an n-th windows; and wherein, at the process (2), the respective average values or the respective adjusted values are assigned to the respective reference blocks by each window from the first to the n-th ones by referring to the information on the reference blocks belonging to the respective n windows and the information on corresponding relations between the calculation blocks and the average values or the adjusted values, wherein, at the process (3), information on respective results of comparison acquired by successively comparing every two values corresponding to all the possible respective pairs which can be selected among all the average values or among all the adjusted values allocated to the reference blocks by each window is acquired as the necessary information.

25. An apparatus for supporting object recognition, comprising:
- an image acquiring part for acquiring a test image as a test set; and
- an object recognizing part for recognizing an object included in the test image by referring to necessary information acquired through processes of: (1) setting calculation blocks, each of which includes one or more pixels in a training image acquired as a training set, acquiring respective average values of the pixels included in the respective calculation blocks, and matching information on the respective calculation blocks with the respective average values or respective adjusted values derived from the respective average values; (2) referring to information on windows, each of which includes information on one or more reference blocks which are different in at least either positions or sizes and information on corresponding relations between the calculation blocks and the average values or the adjusted values, to thereby assign the respective average values or the respective adjusted values to the respective reference blocks; and (3) acquiring the necessary information by using the respective average values or the respective adjusted values assigned to the respective reference blocks, wherein, at the process (2), if a position and a size of a specific reference block among the multiple reference blocks belonging to a window are identical to those of a specified calculation block among the calculation blocks, a particular average value or a particular adjusted value acquired by using the specified calculation block is assigned to the specific reference block.

26. An apparatus for supporting object recognition, comprising:
- an image acquiring part for acquiring a test image as a test set; and
- an object recognizing part for recognizing an object included in the test image by referring to necessary information acquired through processes of: (1) setting calculation blocks, each of which includes one or more pixels in a training image acquired as a training set, acquiring respective average values of the pixels included in the respective calculation blocks, and matching information on the respective calculation blocks with the respective average values or respective adjusted values derived from the respective average values; (2) referring to information on windows, each of which includes information on one or more reference blocks which are different in at least either positions or sizes and information on corresponding relations between the calculation blocks and the average values or the adjusted values, to thereby assign the respective average values or the respective adjusted values to the respective reference blocks; and (3) acquiring the necessary information by using the respective average values or the respective adjusted values assigned to the respective reference blocks, wherein the windows include a first to an n-th windows; and wherein, at the process (2), the respective average values or the respective adjusted values are assigned to the respective reference blocks by each window from the first to the n-th ones by referring to the information on the reference blocks belonging to the respective n windows and the information on corresponding relations between the calculation blocks and the average values or the adjusted values, wherein, at the process (3), information on respective results of comparison acquired by successively comparing every two values corresponding to all the possible respective pairs which can be selected among all the average values or among all the adjusted values allocated to the reference blocks by each window is acquired as the necessary information.

\* \* \* \* \*